United States Patent
Krinke, II et al.

(10) Patent No.: US 8,595,456 B1
(45) Date of Patent: *Nov. 26, 2013

(54) TECHNIQUES FOR INTEGRATING BACKUP MODULES WITH VIRTUALIZED STORAGE

(75) Inventors: Thomas L Krinke, II, Forest Lake, MN (US); Raymond W. Gilson, St. Paul, MN (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/555,867

(22) Filed: Jul. 23, 2012

Related U.S. Application Data (63) Continuation of application No. 12/498,079, filed on Jul. 6, 2009, now Pat. No. 8,230,187.

(51) Int. Cl.
*G06F 12/16* (2006.01)

(52) U.S. Cl.
USPC ............................ 711/162; 711/156; 711/165

(58) Field of Classification Search
USPC .................................. 711/156, 161, 162, 165
See application file for complete search history.

(56) References Cited

U.S. PATENT DOCUMENTS

| | | | |
|---|---|---|---|
| 7,613,890 B1 * | 11/2009 | Meiri ............................. | 711/162 |
| 8,176,271 B2 * | 5/2012 | Srivastava et al. ............ | 711/162 |
| 8,230,187 B1 | 7/2012 | Krinke, II et al. | |
| 8,332,601 B2 * | 12/2012 | Yasuda et al. .................. | 711/162 |
| 2001/0032301 A1 * | 10/2001 | Morita et al. .................. | 711/162 |
| 2001/0047460 A1 * | 11/2001 | Kobayashi et al. ............ | 711/162 |
| 2002/0129203 A1 * | 9/2002 | Gagne et al. ................... | 711/114 |
| 2002/0199073 A1 * | 12/2002 | Tamura et al. ................. | 711/162 |
| 2005/0091463 A1 * | 4/2005 | Halstead et al. ............... | 711/162 |
| 2005/0125616 A1 * | 6/2005 | Johnson et al. ................ | 711/162 |
| 2005/0132156 A1 * | 6/2005 | Hosouchi et al. .............. | 711/162 |
| 2005/0257015 A1 * | 11/2005 | Hiraiwa et al. ................. | 711/162 |
| 2007/0283017 A1 * | 12/2007 | Anand et al. ................... | 709/226 |
| 2008/0098187 A1 * | 4/2008 | Ashour et al. .................. | 711/162 |
| 2008/0307271 A1 * | 12/2008 | Nakajima et al. ................ | 714/47 |
| 2009/0037766 A1 * | 2/2009 | Agombar et al. .................. | 714/5 |
| 2009/0077332 A1 * | 3/2009 | Tsusaka et al. ................. | 711/162 |
| 2009/0249010 A1 * | 10/2009 | Kawada et al. ................ | 711/162 |
| 2009/0292888 A1 * | 11/2009 | Srivastava et al. ............. | 711/162 |
| 2010/0082924 A1 * | 4/2010 | Yasuda et al. .................. | 711/162 |
| 2012/0124310 A1 * | 5/2012 | Bartfai et al. .................. | 711/162 |

OTHER PUBLICATIONS

"A CommVault White Paper: CommVault Galaxy Backup & Recovery", CommVault Systems, Inc., 2008, 39 pages.
"IBM Tivoli Storage Manager Version 5.5—Using the Application Programming Interface", International Business Machines Corporation, 2007, 308 pages.
Unknown, EMC2 Data Sheet: EMC NetWorker, Retrieved from the Internet at: http://www.emc.com/collateral/software/data-sheet/h2257-networker-ds.pdf; Apr. 2009; 2 pages.

* cited by examiner

*Primary Examiner* — John Lane
(74) *Attorney, Agent, or Firm* — Wilmer Cutler Pickering Hale and Dorr LLP (57) ABSTRACT

Techniques for integrating backup applications and/or modules with virtualized storage are disclosed. In one particular exemplary embodiment, the techniques may be realized as a computer implemented method for integrating a backup module with a storage appliance comprising sending a storage device command to a source storage appliance from a source backup module, executing at the source storage appliance the storage device command, and updating one or more source storage indicators associated with the source storage appliance, wherein the one or more source storage indicators include replication status information for one or more portions of electronic storage associated with the source storage appliance.

20 Claims, 5 Drawing Sheets

TECHNIQUES FOR INTEGRATING BACKUP MODULES WITH VIRTUALIZED STORAGE

CROSS-REFERENCE TO RELATED APPLICATIONS

This patent application is a continuation of U.S. patent application Ser. No. 12/498,079, filed Jul. 6, 2009, which is hereby incorporated by reference herein in its entirety.

FIELD OF THE DISCLOSURE

The present disclosure relates generally to system backup and, more particularly, to techniques for integrating backup modules with virtualized storage.

BACKGROUND OF THE DISCLOSURE

Storage appliances and other virtualized storage may provide a front end or head for a backup application or module, enabling access to underlying storage for the backup application or module. A storage appliance, such as a Virtual Tape Library (VTL), may provide benefits such as virtualizing a first form of storage (e.g., disk based storage) as a second form of storage (e.g., tape based storage). However, virtualized storage may not provide access for a backup application or module to functionality or attributes of the underlying physical storage. For example, a backup application or module may not have access to determine whether virtualized storage is being replicated, the status of any replication, replication functionality, or other storage attributes, status, or functionality.

In view of the foregoing, it may be understood that there may be significant problems and shortcomings associated with current techniques for integrating of backup applications and/or modules with storage virtualization technologies.

SUMMARY OF THE DISCLOSURE

Techniques for integrating backup applications and/or modules with virtualized storage are disclosed. In one particular exemplary embodiment, the techniques may be realized as a computer implemented method for integrating a backup module with a storage appliance may comprise sending a storage device command to a source storage appliance from a source backup module, executing at the source storage appliance the storage device command, and updating one or more source storage indicators associated with the source storage appliance, wherein the one or more source storage indicators include replication status information for one or more portions of electronic storage associated with the source storage appliance.

In accordance with other aspects of this particular exemplary embodiment, a computer implemented method for integrating a backup module with a storage appliance may comprise propagating the updated one or more source storage indicators to a target storage appliance via a network.

In accordance with further aspects of this particular exemplary embodiment, a computer implemented method for integrating a backup module with a storage appliance may comprise processing the one or more updated storage indicators set at the target storage appliance by a target backup module.

In accordance with additional aspects of this particular exemplary embodiment, a computer implemented method for integrating a backup module with a storage appliance may comprise updating one or more target storage indicators associated with the target storage appliance by a target backup module, and propagating the one or more updated target storage indicators to the source storage appliance via a network.

In accordance with additional aspects of this particular exemplary embodiment, the storage appliance may comprise a virtual tape library.

In accordance with additional aspects of this particular exemplary embodiment, the storage device command may comprise a SCSI (Small Computer System Interface) command.

In accordance with additional aspects of this particular exemplary embodiment, the storage device command may use one or more unused attributes of a SCSI (Small Computer System Interface) command.

In accordance with additional aspects of this particular exemplary embodiment, the storage device command may comprise a command supported by a SCSI Medium Changer Interface of the virtual tape library.

In accordance with additional aspects of this particular exemplary embodiment, the supported command may comprise at least one of: a code set in a storage element descriptor page, a code set in SCSI diagnostic page, a code set in a SCSI MOVE MEDIUM command, a code set in a SCSI Command Descriptor Block defined for backup application and virtualized storage communication, or a combination of the preceding.

In accordance with additional aspects of this particular exemplary embodiment, the storage device command may comprise a command to determine whether replication is supported for one or more portions of electronic storage.

In accordance with additional aspects of this particular exemplary embodiment, the storage device command may comprise a command to initiate replication for the one or more portions of electronic storage.

In accordance with additional aspects of this particular exemplary embodiment, the one or more updated target storage indicators propagated to the source storage appliance may indicate that the target backup module has processed one or more portions of replicated electronic storage.

In accordance with additional aspects of this particular exemplary embodiment, the sending of a storage device command to the source storage appliance from the source backup module may comprise a command to free storage space associated with at least one of the one or more portions of electronic storage.

In accordance with additional aspects of this particular exemplary embodiment, the processing of the target backup module may include one or more of: making a copy of the one or more portions of replicated electronic storage and importing the one or more portions of replicated electronic storage.

In accordance with additional aspects of this particular exemplary embodiment, the replication status information may include indicators associated with the one or more portions of electronic storage indicating at least one of: a source media indicator, a target media indicator, a copy indicator, a replication in progress indicator, a replication complete indicator, a replication acknowledged indicator, and a generation code indicator.

In accordance with additional aspects of this particular exemplary embodiment, the one or more portions of electronic storage may comprise virtual tape cartridges.

In accordance with additional aspects of this particular exemplary embodiment, the source storage appliance may provide a front end to virtualized storage and the virtualized storage may comprise at least one of: magnetic tape based storage, disk based storage, optical storage, a Storage Area Network (SAN), other persistent electronic storage, and combinations of these.

In accordance with additional aspects of this particular exemplary embodiment, the techniques may be realized at least one processor readable medium for storing a computer program of instructions configured to be readable by at least one processor for instructing the at least one processor to execute a computer process for performing the method.

In another particular exemplary embodiment, the techniques may be realized as an article of manufacture for integrating a backup module with a storage appliance, the article of manufacture comprising at least one processor readable storage medium. The one processor readable storage medium may include instructions carried on the at least one medium, wherein the instructions are configured to be readable from the at least one medium by at least one processor. The execution of the instructions may thereby cause the at least one processor to operate so as to send a storage device command to a source storage appliance from a source backup module, execute at the source storage appliance the storage device command, and update one or more source storage indicators associated with the source storage appliance, wherein the one or more source storage indicators include replication status information for one or more portions of electronic storage associated with the source storage appliance.

In yet another particular exemplary embodiment, the techniques may be realized as a system for integrating a backup module with a storage appliance comprising one or more processors communicatively coupled to a network. The one or more processors may be configured to send a storage device command to a source storage appliance from a source backup module, execute at the source storage appliance the storage device command, and update one or more source storage indicators associated with the source storage appliance, wherein the one or more source storage indicators include replication status information for one or more portions of electronic storage associated with the source storage appliance.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
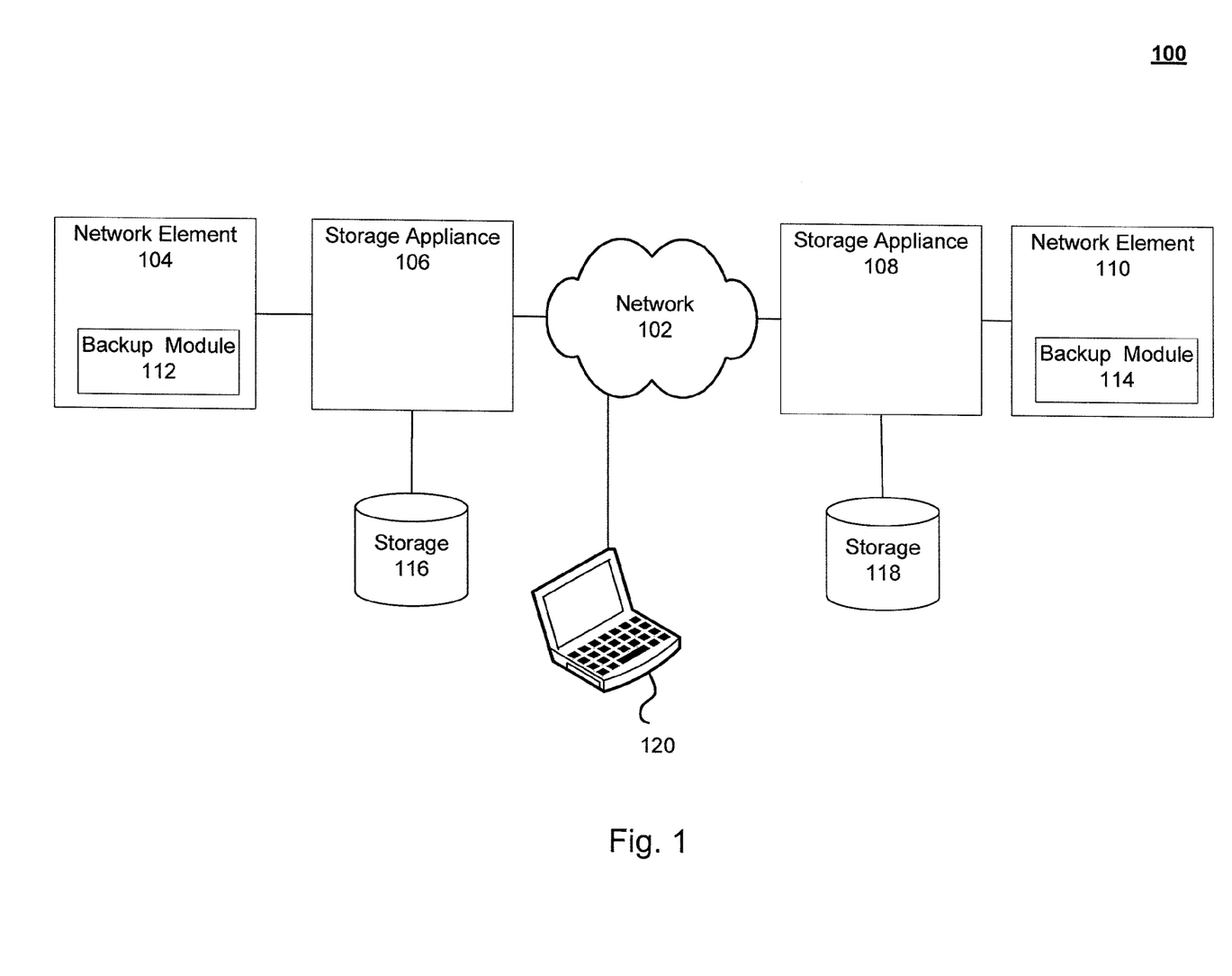
FIG. 1 shows a system for integrating backup modules with virtualized storage in accordance with an embodiment of the present disclosure.

Referring to FIG. 1, there is shown a system 100 for integrating backup modules with virtualized storage in accordance with an embodiment of the present disclosure. FIG. 1 is a simplified view of system 100, which may include additional elements that are not depicted. Network elements 104 and 110 may be communicatively coupled to network 102 via storage appliances 106 and 108, respectively. Network element 110 may contain backup module 114. Network element 104 may contain backup module 112. Computer 120 may be communicatively coupled to network 102. Storage 116 may be communicatively coupled to storage appliance 106. Storage 118 may be communicatively coupled to storage appliance 108.

Network 102 may be a local area network (LAN), a wide area network (WAN), the Internet, a cellular network, a satellite network, or another network that permits communication between network elements 104 and 110, storage appliances 106 and 108, computer 120, and other devices communicatively coupled to network 102. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks.

Network elements 104 and 110 may be application servers, backup servers, network storage devices, media servers, or other devices communicatively coupled to network 102. Network elements 104 and 110 may utilize storage 116 and 118 for the storage of application data, backup data, or other data.

Network elements 104 and 110 may be hosts, such as an application server, which may process data traveling between itself and a backup device, a backup process, and/or storage.

Network element 104 may be a backup server attached to storage appliance 106. In one or more embodiments, network element 104 may be a source or primary backup server and network element 110 may be a target or secondary backup server.

Computer 120 may be a desktop computer, a laptop computer, a server, or other computer. Computer 120 may receive data from user input, a database, a file, a web service, and/or an application programming interface. Computer 120 may query other systems and/or local or remote storage, such as network elements 104 and 110, and storage 116 and 118. Computer 120 may provide a user interface to a backup system.

Storage 116 and 118 may be network accessible storage and may be local, remote, or a combination thereof to network elements 104 and 110. Storage 116 and 118 may utilize a tape, disk, a storage area network (SAN), or other computer accessible storage. Storage 116 and 118 may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage.

Storage appliances 106 and 108 may each be one or more components and/or software for virtualizing storage. Although depicted as separate from storage 116, storage appliance 106 may be integrated with storage 116 and may provide access to storage 116 as a virtualized storage platform. Similarly, storage appliance 108 may be integrated with storage 118. Storage appliances 106 and 108 may provide an interface to one or more storage device commands. The storage device commands may contain vendor unique codes, optional fields, or other space within a command specification that may allow insertion of indicators, flags, or setting of bits to communicate status and commands between a storage platform and a backup application. For example, storage appliance 106 may virtualize storage 116 to present it as a Virtual Tape Library (VTL) to backup applications and/or components. Storage appliance 106 may provide an interface to one or more storage device commands. A backup application, such as backup module 112, may use vendor unique codes, optional fields, or other space within a command specification of the storage device command to determine status or attributes of storage 116. Backup module 112, may use vendor unique codes, optional fields, or other space within a command specification of storage device commands to issue one or more commands to storage 116. Storage appliance 108 may also provide an interface to one or more storage device commands. Similarly, backup module 114, may use vendor unique codes, optional fields, or other space within a command specification of storage device commands to determine status or attributes of storage 118. These vendor unique codes, optional fields, or other space within a command specification of storage device commands may be propagated or replicated across network 102 between storage appliance 106 and storage appliance 108. Thus, if backup module 112 represents a source backup application, changes set on attributes or flags associated with storage 116 may be replicated or propagated across network 102 to storage 118. Storage 118 may be target storage associated with a target backup system, such as backup module 114. Status information communicated may include replication status information such as a version or generation, replication indicators, date/time flags and/or other indicators. Commands communicated may include replication commands.

In one or more embodiments, storage appliances 106 and 108 may be Virtual Tape Libraries which may provide a SCSI Medium Changer interface to enable access to replication information and functionality. For example, a SCSI command interface may permit the triggering of replication of virtual tape cartridges, the determination of replication capabilities of virtual tape cartridges, the determination of replication status information of virtual tape cartridges, and other integration between a backup application (e.g., backup modules 112 and 114) and virtualized storage (e.g., storage appliances 106 and 108). For example, the SCSI specification for Medium Changers may provide sufficient namespace within its supported commands for vendor-unique opcodes, pagecodes, and status codes to be used for the control of replication of Virtual Tape Libraries (VTLs).

According to some embodiments, a vendor-unique section of a storage element descriptor page may be used between replicating VTLs as means of 'hand-shaking' or integration for a backup application. A replication may be initiated by the backup application (e.g., backup module 112) using a vendor-unique diagnostic pagecode. The pagecode may define a portion of storage to replicate, such as a virtual tape cartridge, via an associated voltag (barcode) as defined in an associated SCSI storage element descriptor page. According to some embodiments, the use of a voltag may permit a source and a target of a replication to map underlying replicating disk data to a same portion of storage (storage element, e.g. a virtual tape cartridge) in respective VTL heads (front ends). Similarly, replication on a target (e.g., storage appliance 108) may be acknowledged by a target backup application (e.g., backup module 114) by using a second vendor-unique diagnostic pagecode. The second vendor-unique diagnostic pagecode may communicate to the VTLs (e.g., storage appliance 106 and 108) that the replication has been consumed or processed by the target backup application (e.g., backup module 114). Commands are not limited to diagnostic pages. That is, similar integration between a backup module and virtualized storage may be accomplished using other supported mechanisms such as a VTL SCSI MOVE MEDIUM command. According to one or more embodiments, the command may be a SCSI Command Descriptor Block defined for backup application and virtualized storage communication.

The use of a vendor-unique diagnostic pagecode or other flags within SCSI namespace may enable determination if a VTL or other storage appliance supports replication, the type of support for replication, and portion of storage (e.g., virtual tape cartridges) for which replication is supported. Such replication information may be stored by new bits (e.g., a vendor unique op-code, a pagecode, and/or a status code) in a storage element descriptor page associated with a storage element such as a virtual tape cartridge. A backup application, such as backup module 112, may access this information by performing an inventory on a VTL (e.g., storage appliance 106). For each storage element (e.g., a virtual tape cartridge), an associated vendor unique diagnostic pagecode may indicate whether a storage element represents a replicating media (source), a replica (read-only target) media, or a copy (read/write copy) media. Additional indicators or flags may be used to indicate whether a replication is in progress, a replication is complete, and whether a replica has been acknowledged (e.g., processed by a target backup application). Other indicators may provide a version or a generation code for each storage element descriptor. The generation code may enable a backup application at a target (e.g., backup module 114) to detect changes by a backup application at a source (e.g., backup module 112). Such integration between a backup module or application and a storage appliance, such as a VTL, may reduce a need for personnel configuring a storage appliance to understand configuration of a backup application. Such integration between a backup module or application and a storage appliance such as a VTL may also reduce a need for personnel configuring a backup application to understand configuration of a storage appliance.

Additionally, by providing access to replication status information and functionality in a backup module, the backup module may be able to provide further intelligence and functionality. For example, by capturing the nature of each virtual tape cartridge's replication, a backup module may be able to automatically apply relevant intelligence in its virtual tape cartridge selection algorithms. As a specific example, replica media may be treated as read-only and may be used only for the purpose of making copies or for restorations. Furthermore, changes to a generation code associated with a portion of storage (e.g., a virtual tape cartridge) at a source side may also change a corresponding generation code at a target side immediately. Similarly, changes to replicating, replicated, and replica acknowledged flags may be propagated between source and target VTL heads immediately. Since a VTL may be replicating virtual tapes and not backup images, several conditions may be followed. Regarding a replica cartridge, a voltag (i.e., a barcode associated with the replica cartridge) may be identical to a corresponding source cartridge. Also, contents and image extents of any particular virtual cartridge in a source VTL may be preserved when replicated to a target VTL. Additionally, replication of data may be written serial in time. This may imply that when a backup application at a target can read a last block of data written and validate its contents, it may be guaranteed to have a replica of the related data fragments written prior to the last block.

According to some embodiments, various rules may be implemented for the significance and timing of flags or other indicators set in SCSI command op-codes or pagecodes. For example, any time a write is completed on a virtual cartridge at a source, that virtual tape cartridge's generation code may be incremented and a replica acknowledged bit associated with the virtual tape cartridge may be cleared.

According to some embodiments, after a backup application has written to a source virtual tape, it may trigger replication of the virtual tape using a SCSI Send Diagnostic command with a vendor unique diagnostic page. This vendor unique diagnostic page may identify a voltag or source element address of a virtual cartridge to be replicated. When the virtual cartridge has finished replication, a replicated flag may be set by VTL heads. Additionally, a unit attention condition may be set on a source VTL head and a target VTL head. The unit attention condition may be a flag that may trigger a backup application to scan for a change or an update. According to some embodiments, the unit attention condition or flag may not be used and a backup application may poll or monitor for changes to replicated data or corresponding attributes. When the unit attention condition or flag is recognized by a backup application at the source (e.g., backup module 112), it may allow further write operations on the virtual cartridge. However, the virtual cartridge may not be available for writing while a replicating bit (indicating that the associated virtual cartridge is currently replicating) is set.

When a unit attention condition or flag is recognized by a backup application at a target (e.g., backup module 114), the backup application may perform a SCSI Read Element Status for one or more storage elements (e.g., virtual tape cartridges). This may be an inventory operation for one or more storage elements. For each storage element in a list which is marked as a replica, which has a generation code that has changed since the virtual cartridge was last read, and which also has a corresponding 'replicated' bit set, a target backup application (e.g., backup module 114) may be free to read a date from the replicated virtual cartridge and may perform one or more additional steps. For example, the target backup application may make a local copy, do an import, or perform other actions. Once the target backup application is done processing the replicated data, it may use a second SCSI diagnostic page to indicate completion of processing to a source backup application. The contents of the diagnostic page may be a voltag or element address associated with a replica virtual cartridge. This operation may set a replica acknowledged bit and set a unit attention condition at a source VTL head. When the unit attention condition is recognized by the source backup application, it may read element status and may use the replica acknowledged bit as an indicator that the source backup application may be free to use the virtual cartridge again. For example, the source backup application may possibly delete the virtual cartridge and free disk space.

Deleting a virtual cartridge may be implemented via a third command. If a replicating bit for a virtual cartridge is not set (indicating that the cartridge is not currently replicating), a replicated bit is set (indicating that replication has successfully completed), and a replica acknowledged bit (indicating that a target backup application has finished processing the replica) is set, the source backup application may wish to free the disk space associated with the virtual cartridge. In this case, the source backup application may issue a command to 'free' the virtual cartridge. This may be a diagnostic pagecode sent using a SCSI Send Diagnostic command, and the pagecode may contain the voltag, storage element address, or other unique identifier corresponding to the virtual cartridge. This may allow the VTL at the source to free one or more portions of space associated with the virtual tape cartridge. This may also clear the replicated, replicating, and replica acknowledged flags on both the source and target VTL heads, and may set a unit attention condition at the target indicating that the replica is freed as well.

The above exemplary embodiment is one example of integrating a backup application with virtualized storage using an interface to a storage device command. Other commands may be utilized to communicate storage attributes, storage status, and provide access to storage functionality.

Figure 2:
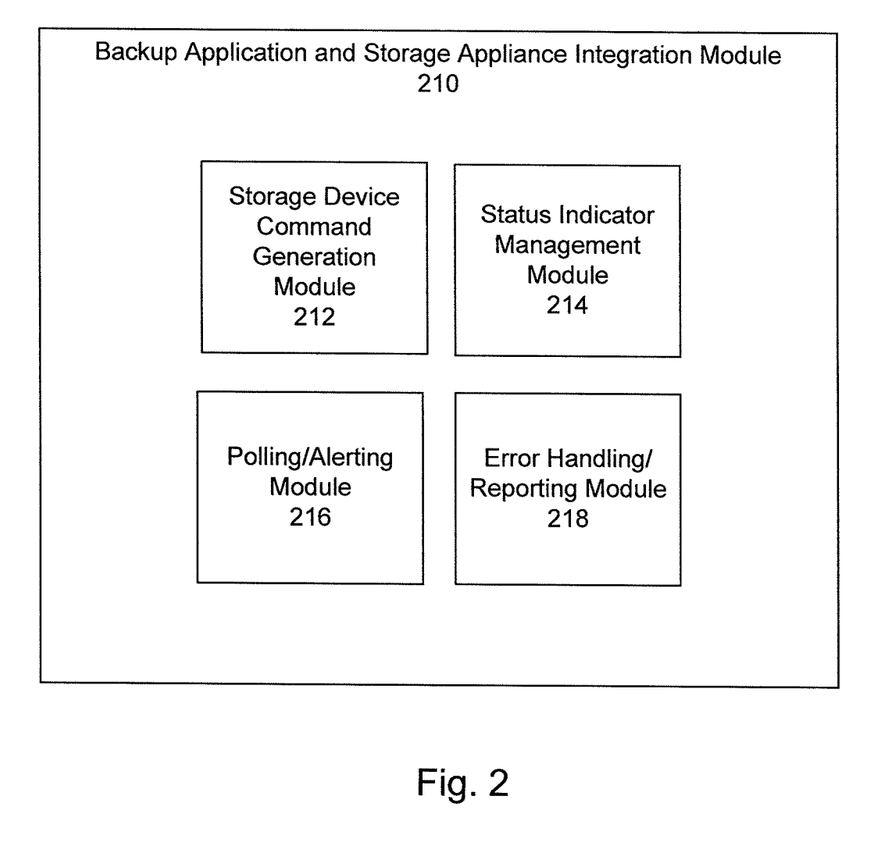
FIG. 2 shows a module for integrating backup modules with virtualized storage in accordance with an embodiment of the present disclosure.

Referring to FIG. 2, there is shown a backup application and storage appliance integration module 210 in accordance with an embodiment of the present disclosure. As illustrated, the backup application and storage appliance integration module 210 may contain one or more components including storage device command generation module 212, status indicator management module 214, polling/alerting module 216, and error handling/reporting module 218.

Storage device command generation module 212 may utilize one or more storage device commands to communicate between virtualized storage and a backup application. Storage device command generation module 212 may utilize vendor specific, optional, or other fields specified with or in storage device commands to obtain virtualized storage information and provide virtualized storage commands.

Status indicator management module 214 may ensure that status indicators are updated at both a source and a target end when storage is modified or other associated conditions have changed. For example, status indicator management module 214 may manage replicated, replicating, replica acknowledged, unit attention, generation code and/or other flags, indicators, or bits.

Polling/alerting module 216 may monitor a unit attention condition and may trigger a backup application to take one or more actions if a unit attention condition is set. In one or more embodiments, polling/alerting module 216 may poll one or more attributes associated with virtualized storage portions, such as a virtual tape cartridge. Polling/alerting module 216 may look for modifications to attributes and may trigger appropriate actions.

Error handling/reporting module 218 may handle errors associated with backup, replication, virtualized storage and backup application communication, and other processes. Error handling/reporting module 218 may log errors, such as errors occurring during setting of flags or attributes, errors occurring while triggering replication, errors occurring while obtaining replication status, and other error related events. Error handling/reporting module 218 may handle errors that may occur if a backup application attempts to perform an action that is not appropriate for a portion of storage based upon the storage's current status (e.g., an attempt to write to currently replicating storage). Error handling/reporting module 218 may provide prompts, reports, and/or user interfaces for handling errors.

Figure 3:
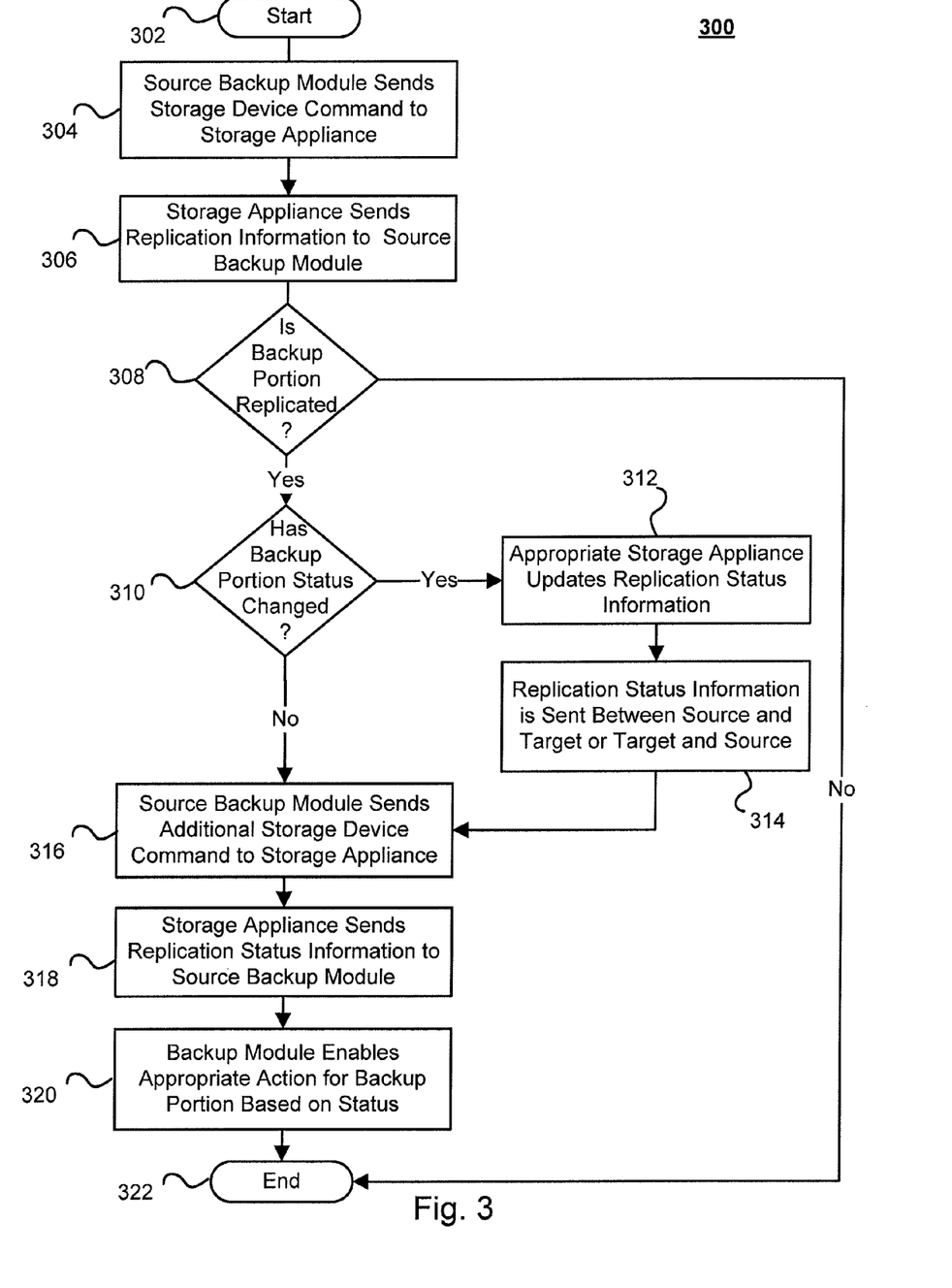
FIG. 3 depicts a method for integrating backup modules with virtualized storage in accordance with an embodiment of the present disclosure.

Referring to FIG. 3, there is depicted a method 300 for integrating backup modules with virtualized storage in accordance with an embodiment of the present disclosure. At block 302, the method 300 for integrating backup modules with virtualized storage may begin.

At block 304, a source backup module may send a storage device command to a storage appliance. For example, the storage appliance may be a Virtual Tape Library exposing one or more SCSI target devices and providing a SCSI command interface. The command may be a SCSI medium changer command that may return SCSI element descriptor page information with bits set indicating replication status information for one or more portions of storage (e.g., virtual tape cartridges).

At block 306, the storage appliance may send replication information to the source backup module (e.g., a storage element descriptor page with vendor unique codes indicating replication information).

At block 308, the method 300 may include determining if replication is supported for a backup portion. If replication is not supported the method 300 may end at block 322. If replication is supported the method 300 may continue at block 310.

At block 310, the method 300 may include determining whether the status of a backup portion has changed. If the status has changed, the method 300 may continue at block 312. If the status has not changed the method 300 may continue at block 316.

At block 312, the appropriate storage appliance may update replication status information. For example, if a virtual tape cartridge has changed at a source VTL, the source VTL may update one or more indicators such as a generation code.

At block 314, the replication status information may be propagated between source and target storage appliances or between target and source storage appliances.

At block 316, a source backup module may send an additional storage device command to the storage appliance. The command may be used as a query for additional replication information, to initiate replication, to free replica space, or to perform other actions.

At block 318, the storage appliance may send replication status information to the source backup module.

At block 320, the source backup module may enable appropriate action for the backup portion based on the status of the backup portion. For example, a virtual tape cartridge may be read only to a backup application while the virtual tape cartridge is replicating. Once replication is complete the virtual tape cartridge may be writable.

At block 322, the method 300 may end.

Figure 4:
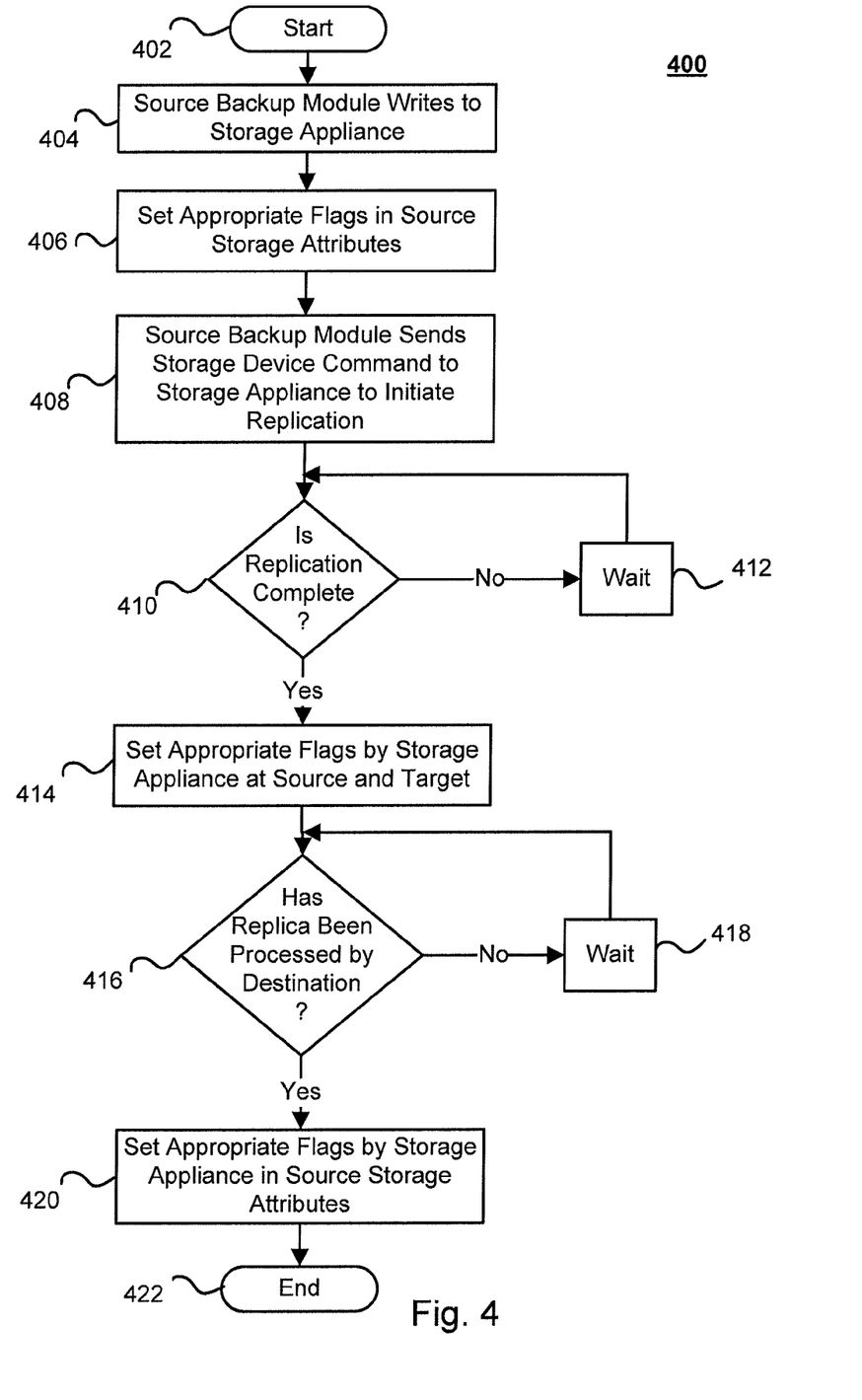
FIG. 4 depicts a method for integrating backup modules with virtualized storage in accordance with an alternative embodiment of the present disclosure.

Referring to FIG. 4, there is depicted a method 400 for integrating backup modules with virtualized storage in accordance with an alternative embodiment of the present disclosure. At block 402, the method 400 for integrating backup modules with virtualized storage may begin.

At block 404, a source backup module may write to storage provided by a storage appliance.

At block 406, the source storage appliance may set appropriate flags in source storage attributes, such as, for example, SCSI descriptor pagecodes associated with a portion of storage. The flags may indicate a generation code and/or other information.

At block 408, a source backup module may send storage device commands to the storage appliance to initiate replication. For example, a pagecode in a SCSI element descriptor page may specify a unique identifier of a portion of storage (e.g., a voltag) to replicate. The SCSI element descriptor page may be provided as part of a SCSI command issued from a source backup module to the source storage appliance.

At block 410, the method 400 may include determining whether replication is complete. If replication is complete, the method may continue at block 414. If replication is not complete the method may continue at block 412.

At block 412, the method 400 may include waiting and then returning to block 410.

At block 414, the storage appliance may set appropriate flags or indicators at a source and propagate the information to be set at a target. Flags or indicators may include a replication in progress indicator, a generation code, and other indicators. The storage appliance may also trigger appropriate conditions at a target such as, for example, a unit attention condition.

At block 416, the method 400 may include determining whether a replica (i.e., a portion of storage such as, for example, a virtual tape cartridge, that has replication enabled) has been processed by a destination or target backup module. If the replica has been processed the method 400 may continue at block 420. If the replica has not been processed the method may continue at block 418.

At block 418, the method 400 may include waiting and then may returning to block 416.

At block 420, appropriate flags or indicators may be set by the source storage appliance. According to some embodiments, this may be implemented by the use of a replication acknowledged indicator that may be set by a target backup module and propagated to the source storage appliance indicator associated with the replica. Other flags such as a unit attention condition may be utilized to trigger one or more actions from a backup module.

At block 422, the method 400 may end.

Figure 5:
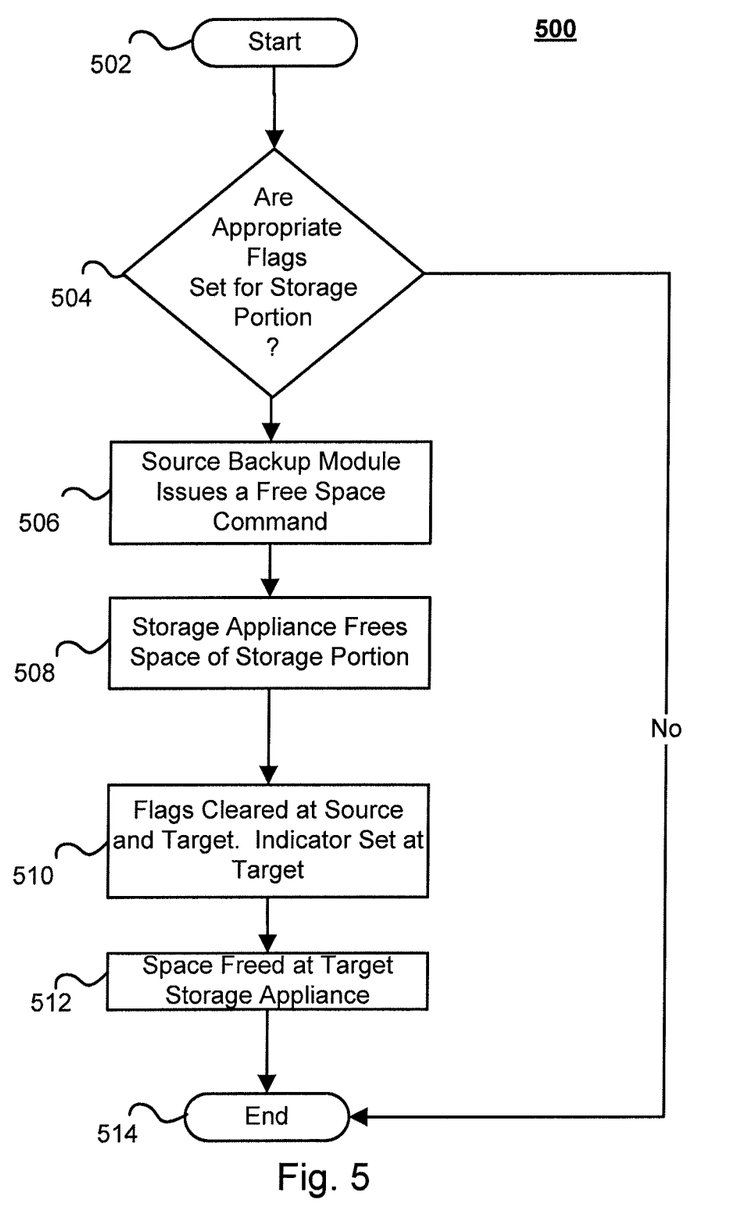
FIG. 5 depicts a method for integrating backup modules with virtualized storage in accordance with another alternative embodiment of the present disclosure.

Referring to FIG. 5, there is depicted a method 500 a method for integrating backup modules with virtualized storage in accordance with another alternative embodiment of the present disclosure. At block 502, the method 500 for integrating backup modules with virtualized storage may begin.

At block 504, the method 500 may include determining whether appropriate flags or indicators are set in storage attributes associated with storage (e.g., vendor unique op codes of a SCSI element descriptor page associated with a storage element at a storage appliance). If the flags are set indicating that a portion of storage is not currently replicating, has been replicated, and the replica has been acknowledged, the method 500 may continue at block 506. If one or more flags or indicators indicate that a portion of storage may not be freed or deleted, the method 500 may end at block 514. According to one or more embodiments, storage may be freed regardless of the setting of one or more indicators.

At block 506, a source backup module may issue a free space command. The command may be implemented as a SCSI command, such as a SCSI Move Medium command, a SCSI Send Diagnostic Command, a SCSI Command Descriptor Block defined for backup application and virtualized storage communication, or other SCSI command containing a code, such as a vendor unique code, an optional code, or other indicator specifying a particular portion of storage to be freed. For example, the indicator may specify a voltag uniquely identifying a virtual tape cartridge.

At block 508, a source storage appliance may free the space of the indicated portion of storage.

At block 510, the source storage appliance may clear one or more flags or indicators associated with the portion of storage. The flags or indicators may be propagated to a target storage appliance and set appropriately there. A unit attention condition may also be set there triggering a target backup module to take one or more actions.

At block 512, space associated with the storage may be freed at the target storage appliance.

At block 514, the method 500 may end.

At this point it should be noted that integrating backup modules with virtualized storage in accordance with the present disclosure as described above typically involves the processing of input data and the generation of output data to some extent. This input data processing and output data generation may be implemented in hardware or software. For example, specific electronic components may be employed in a module for integrating backup modules with virtualized storage or similar or related circuitry for implementing the functions associated with integrating backup modules with virtualized storage in accordance with the present disclosure as described above. Alternatively, one or more processors operating in accordance with instructions may implement the functions associated with integrating backup modules with virtualized storage in accordance with the present disclosure as described above. If such is the case, it is within the scope of the present disclosure that such instructions may be stored on one or more processor readable media (e.g., a magnetic disk, magnetic tape, optical media, or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer implemented method for integrating a backup module with virtualized storage comprising:
updating, by a target backup module, one or more target storage indicators associated with a target storage appliance;
propagating, using at least one computer processor, the one or more updated target storage indicators to a source storage appliance via a network, wherein the one or more updated target storage indicators propagated to the source storage appliance indicate that the target backup module has processed one or more portions of replicated electronic storage; and
updating one or more source storage indicators associated with the source storage appliance.

2. The method of claim 1, wherein propagating the one or more updated target storage indicators provides physical storage information to one or more backup modules for physical storage underlying virtualized storage.

3. The method of claim 1, wherein the storage appliance comprises a virtual tape library.

4. The method of claim 1, further comprising:
receiving the one or more updated source storage indicators from the source storage appliance at a source backup module.

5. The method of claim 4, wherein based on the receipt of the one or more updated source storage indicators, the source backup module issues a storage device command to the source storage appliance to free storage space associated with at least one of the one or more portions of electronic storage.

6. The method of claim 1, wherein processing includes one or more of: making a copy of the one or more portions of replicated electronic storage, and importing the one or more portions of replicated electronic storage.

7. The method of claim 1, further comprising:
sending a storage device command to the source storage appliance from the source backup module;
executing, using at least one computer processor, at the source storage appliance the storage device command;
updating the one or more source storage indicators associated with the source storage appliance, wherein the one or more source storage indicators include replication status information for one or more portions of electronic storage associated with the source storage appliance; and
propagating the updated one or more source storage indicators to the target storage appliance via the network.

8. The method of claim 7, wherein the storage device command comprises use of one or more unused attributes of a SCSI (Small Computer System Interface) command.

9. The method of claim 7, wherein the storage device command comprises a command supported by a SCSI Medium Changer Interface of the virtual tape library.

10. The method of claim 7, wherein the command comprises at least one of: a code set in a storage element descriptor page, a code set in SCSI diagnostic page, a code set in a SCSI MOVE MEDIUM command, a code set in a SCSI Command Descriptor Block defined for backup application and virtualized storage communication, or a combination of the preceding.

11. The method of claim 7, wherein the storage device command comprises a command to determine whether replication is supported for one or more portions of electronic storage.

12. The method of claim 7, wherein the command comprises a command to initiate replication for one or more portions of electronic storage.

13. The method of claim 7, wherein replication status information includes indicators associated with a portion of storage indicating at least one of: a source media indicator, a target media indicator, a copy indicator, a replication in progress indicator, a replication complete indicator, a replication acknowledged indicator, and a generation code indicator.

14. The method of claim 7, wherein the one or more portions of storage comprise virtual tape cartridges.

15. The method of claim 1, further comprising:
processing the one or more updated target storage indicators set at the target storage appliance by a target backup module.

16. The method of claim 1, wherein the storage device command comprises a SCSI (Small Computer System Interface) command.

17. The method of claim 1, wherein the storage appliance provides a front end to virtualized storage, the virtualized storage comprising at least one of: magnetic tape based storage, disk based storage, optical storage, a Storage Area Network (SAN), other persistent electronic storage, and a combination of the preceding.

18. At least one non-transitory processor readable storage medium storing a computer program of instructions configured to be readable by at least one processor for instructing the at least one processor to execute a computer process for performing the method as recited in claim 1.

19. An article of manufacture for integrating a backup module with virtualized storage, the article of manufacture comprising:
- at least one non-transitory processor readable storage medium; and
- instructions carried on the at least one medium;
- wherein the instructions are configured to be readable from the at least one medium by at least one processor and thereby cause the at least one processor to operate so as to:
  - update one or more target storage indicators associated with a target storage appliance by a target backup module;
  - propagate the one or more updated target storage indicators to a source storage appliance via a network, wherein the one or more updated target storage indicators propagated to the source storage appliance indicate that the target backup module has processed one or more portions of replicated electronic storage; and
  - update one or more source storage indicators associated with the source storage appliance.

20. A system for integrating a backup module with virtualized storage comprising:
- one or more processors communicatively coupled to a network; wherein the one or more processors are configured to:
  - update one or more target storage indicators associated with a target storage appliance by a target backup module;
  - propagate the one or more updated target storage indicators to a source storage appliance via a network, wherein the one or more updated target storage indicators propagated to the source storage appliance indicate that the target backup module has processed one or more portions of replicated electronic storage; and
  - update one or more source storage indicators associated with the source storage appliance.

\* \* \* \* \*